(12) United States Patent  
Chae

(10) Patent No.: US 8,346,168 B2
(45) Date of Patent: Jan. 1, 2013

(54) MOBILE TERMINAL AND CALL CONNECTION METHOD THEREOF

(75) Inventor: Hee-Jin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 1108 days.

(21) Appl. No.: 12/243,696

(22) Filed: Oct. 1, 2008

(65) Prior Publication Data

US 2009/0163141 A1 Jun. 25, 2009

(30) Foreign Application Priority Data

Dec. 21, 2007 (KR) .......................... 10-2007-0135703

(51) Int. Cl.
*H04B 7/00* (2006.01)
(52) U.S. Cl. ...................................... 455/41.2; 455/41.3
(58) Field of Classification Search ................ 455/41.2, 455/41.3, 566, 127.4, 412.2, 445, 567, 401, 455/500, 503, 511
See application file for complete search history.

(56) References Cited

U.S. PATENT DOCUMENTS

| | | | | |
|---|---|---|---|---|
| 7,844,906 | B2* | 11/2010 | Berger | 715/747 |
| 7,925,212 | B2* | 4/2011 | Eisenbach | 455/41.2 |
| 2006/0046709 | A1 | 3/2006 | Krumm et al. | |
| 2006/0199538 | A1 | 9/2006 | Eisenbach | |

* cited by examiner

*Primary Examiner* — Eugene Yun
(74) *Attorney, Agent, or Firm* — Lee, Hong, Degerman, Kang & Waimey

(57) ABSTRACT

A method of communicating with short range wireless devices using a mobile terminal includes selectably communicating with a plurality of portable wireless devices to support at least one operating mode. The mobile terminal includes a short range communication module configured to be connected to and communicate with a plurality of paired short range portable wireless devices, an input unit for recognizing an external input received to configure the mobile terminal to support at least one operating mode with at least one portable wireless device, and a controller configured to support the at least one operating mode with the at least one portable wireless device, the controller controlling the short range communication module such that the short range communication module selectively communicates with the plurality of portable wireless devices to support a first operating mode.

31 Claims, 13 Drawing Sheets

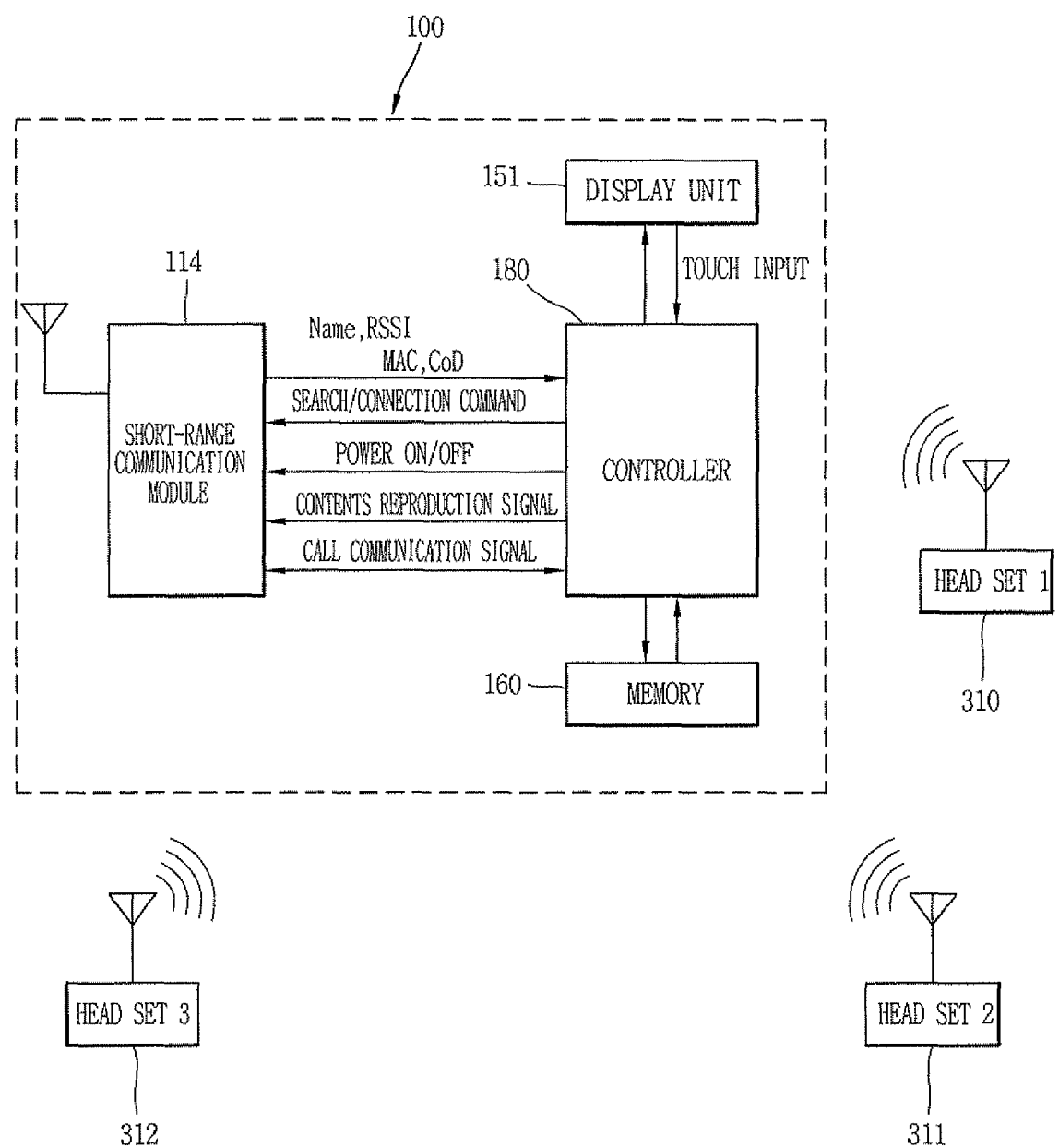

MOBILE TERMINAL AND CALL CONNECTION METHOD THEREOF

CROSS-REFERENCE TO RELATED APPLICATIONS

Pursuant to 35 U.S.C. §119(a), this application claims the benefit of earlier filing date and right of priority to Korean Application No. 10-2007-0135703, filed on Dec. 21, 2007, the contents of which are hereby incorporated by reference herein in their entirety.

FIELD OF THE INVENTION

The present invention relates to a method of connecting a call or allowing various types of communication to a wireless device set as a default or to a particular wireless device selected by a user when the call is received by a mobile terminal while a plurality of wireless devices are connected to the mobile terminal. The present invention further relates to the mobile terminal implementing the method.

DISCUSSION OF THE RELATED ART

A mobile terminal may be configured to perform various functions. Examples of the various functions include data and voice communications, game playing, and multimedia player function for capturing images and video via a camera, recording audio, playing music files via a speaker system, and displaying images and video on a display. More recently, some mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal. In terms of design, folder type, slide type, bar type, or rotation type design may be applied for mobile terminals.

In the related art, mobile terminals do not support a method for connecting a call to a particular wireless device when the call is received while a plurality of wireless devices, such as a wireless headset or an ear set, are connected to a mobile terminal by a plurality of users.

SUMMARY OF THE INVENTION

According to an embodiment of the present invention, a method of communicating with short range wireless devices using a mobile terminal includes pairing the mobile terminal with a plurality of short range portable wireless devices, configuring the mobile terminal to support at least one operating mode with at least one portable wireless device, and selectably communicating with the plurality of portable wireless devices to support a first operating mode. Preferably, the method also includes operatively communicating with a first portable wireless device to support the first operating mode and operatively communicating with a second portable wireless device to support a second operating mode. The method may also include configuring the second portable wireless device to support the first operating mode while the first portable wireless device is supporting the first operating mode.

In one aspect of the present invention, both the first and second portable wireless devices support the first operating modes when the second portable wireless device is configured to support the first operating mode. Alternatively, the first portable wireless device stops supporting the first operating mode when the second portable wireless device supports the first operating mode.

In one aspect of the present invention, the method further includes configuring one of the plurality of portable wireless devices as a default to support the first operating mode. In another aspect of the present invention, the first operating mode is a voice communication mode and the second operating mode is a multimedia playback mode.

In one aspect of the present invention, when a call is received while the first operating mode is executed in the first portable wireless device, the second portable wireless device is selected to connect the call and the multimedia playback mode is paused while the call is connected to the second portable wireless device, wherein the paused playback mode is resumed when the call is disconnected from the second portable wireless device. When a call is received, the display unit displays information related to which portable wireless device the call is connected.

In one aspect of the present invention, the first operating mode may be a voice communication mode for a first incoming call and the second operating mode may be a voice communication mode for a second incoming call. The method further includes displaying information regarding the first incoming call and the first portable wireless device connected to the first incoming call on a first portion of a display and displaying information regarding the second incoming call and the second portable wireless device connected to the second incoming call on a second portion of the display.

When a call is received, the method further includes displaying information to interface with a user to provide an option to connect the call to one or more of the plurality of portable wireless devices. Preferably, a list including the one or more of the plurality of portable wireless devices is displayed on a display comprising a touch screen and at least one of the displayed plurality of portable wireless devices is selected via the touch screen.

In one aspect of the present invention, when a voice communication is received, a signal is transmitted from the mobile terminal to the plurality of portable wireless devices, and the mobile terminal establishes a communication link with at least one of the plurality of portable wireless devices that responded with an acknowledge signal to the mobile terminal. In another aspect of the present invention, when a phone number is entered or a contact is selected from a contact list to place an outgoing call, the display unit displays information to interface with a user to provide an option to connect the outgoing call to at least one of the plurality of portable wireless devices. Preferably, while a phone number is being entered to initiate an outgoing call, the display unit displays a list of phone numbers searched from a contact list, the searched phone numbers including entered digits of the phone number.

In one aspect of the present invention, the method further includes displaying a list of portable wireless devices available for connection to the outgoing call and selecting at least one portable wireless device from the list to connect to the outgoing call. The method may also include configuring each of the plurality of portable wireless devices to support at least one operating mode, wherein the at least one operation mode comprises a voice communication mode or a multimedia playback mode.

According to an embodiment of the present invention, a mobile terminal includes a short range communication module configured to be connected to and communicate with a plurality of paired short range portable wireless devices, an input unit for recognizing an external input received to configure the mobile terminal to support at least one operating mode with at least one portable wireless device, and a controller configured to support the at least one operating mode with the at least one portable wireless device, the controller controlling the short range communication module such that the short range communication module selectively communicates with the plurality of portable wireless devices to support a first operating mode. In one aspect of the present invention, the short range communication module communicates with a first portable wireless device to execute the first operating mode and with a second portable wireless device to execute a second operating mode.

In the mobile terminal, the controller may configure the second portable wireless device to support the first operating mode while the first portable wireless device is supporting the first operation mode. The controller may configure at least one of the plurality of portable wireless devices as a default to support the first operation mode. Preferably, the controller supports one or more operating modes with a single portable wireless device.

In one aspect of the present invention, the controller supports the first operating mode with a first portable wireless device and a second operating mode with a second wireless device. In another aspect of the present invention, the first operating mode may be a voice communication mode and the second operating mode may be a multimedia playback mode. Alternatively, the first operating mode may be a voice communication mode for a first incoming call and the second operating mode may be a voice communication mode for a second incoming call.

Preferably, the controller supports multiple calls with at least two of the plurality of portable wireless devices. Preferably, the mobile terminal includes a display unit, wherein when a call is received, the display unit displays information related to which portable wireless device the call is connected. Alternatively, when a call is received, the display unit may display information providing an option to connect the call to one or more of the portable wireless devices. Preferably, the display unit includes a touch screen and the one or more of the portable wireless devices to be connected to the call are selected via the touch screen.

In one aspect of the present invention, the short range communication module transmits a signal to the plurality of portable wireless devices when a voice communication is received and establishes a communication link with at least one of the plurality of portable wireless devices that responded with an acknowledge signal to the mobile terminal. In another aspect of the present invention, the mobile terminal may include at least two display units, wherein a first display unit displays information regarding the first operating mode and a second display unit displays information regarding a second operating mode.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 5 is a schematic block diagram of the mobile terminal that performs call communication by connecting a plurality of wireless headsets according to an embodiment of the present invention.

DETAILED DESCRIPTION OF PREFERRED EMBODIMENT

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The mobile terminal according to the present invention will now be described. The mobile terminal may be implemented in various forms. Examples of such mobile terminals include mobile phones, user equipments, smart phones, computers, digital broadcast terminals, personal digital assistants, portable multimedia players (PMP) and navigators.

Figure 1:
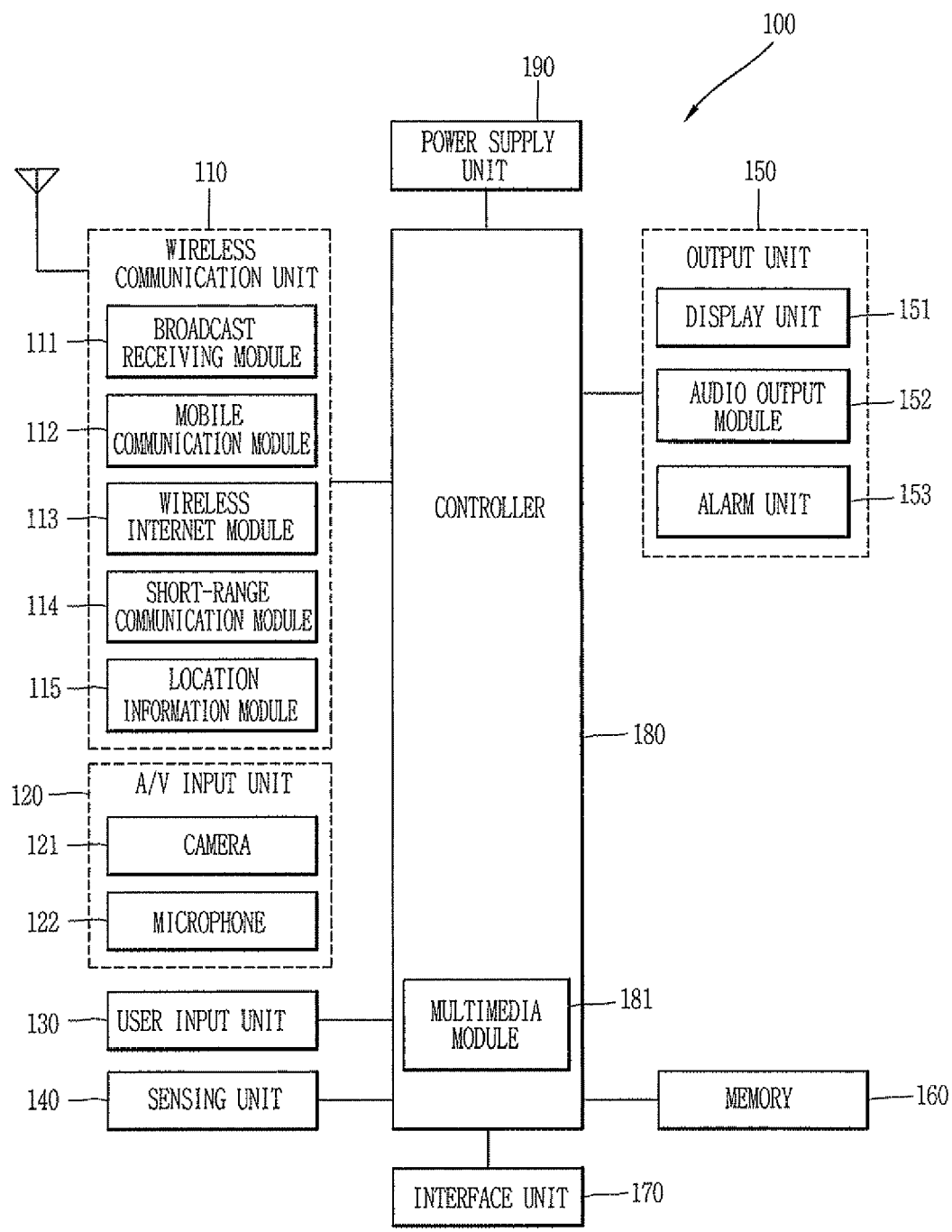
FIG. 1 is a schematic block diagram of a mobile terminal according to an embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel or a terrestrial channel. The broadcast managing entity refers generally to a system which transmits a broadcast signal and/or broadcast associated information.

Examples of the broadcast associated information include information associated with a broadcast channel, a broadcast program, and a broadcast service provider. For example, the broadcast associated information may include an electronic program guide (EPG) of digital multimedia broadcasting (DMB) or an electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. Data received by the broadcast receiving module 111 may be stored in a suitable device, such as a memory 160.

The mobile communication module 112 communicates wireless signals with one or more network entities, such as a base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and HSDPA (High Speed Downlink PacketAccess).

The short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as BLUETOOTH® and Zigbee®.

The position-location module 115 identifies or otherwise obtains the location of the mobile terminal 100. The position-location module 115 may be implemented using global positioning system (GPS) components which cooperate with associated satellites, network components, and combinations thereof.

The audio/video (ANV) input unit 120 is configured to provide audio or video signal input to the mobile terminal 100. As shown, the AN input unit 120 includes a camera 121 and a microphone 122.

The camera 121 receives and processes image frames of still pictures or video. The microphone 122 receives an external audio signal while the portable device is in a particular mode, such as phone call mode, recording mode or voice recognition mode. This audio signal is processed and converted into digital data.

The mobile terminal 100 and specifically the AN input unit 120, may include assorted noise removing algorithms to remove noise generated in the course of receiving the external audio signal. Data generated by the AN input unit 120 may be stored in the memory 160, utilized by the output unit 150, or transmitted via one or more modules of the communication unit 110. If desired, two or more microphones 122 and/or cameras 121 may be used.

The user input unit 130 generates input data responsive to user manipulation of an associated input device or devices. Examples of such devices include a keypad, a dome switch, a touchpad such as a static pressure/capacitance, a jog wheel and a jog switch. A specific example is a user input unit 130 configured as a touchpad in cooperation with a touch screen display, which will be described in more detail below.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, or the orientation or acceleration/deceleration of the mobile terminal.

The sensing unit 140 may sense whether a sliding portion of the mobile terminal 100 is open or closed if the mobile terminal is configured as a slide-type mobile terminal. The sensing unit 140 may also sense the presence or absence of power provided by the power supply 190, and the presence or absence of a coupling or other connection between the interface unit 170 and an external device.

The interface unit 170 may be implemented to couple the mobile terminal 100 with external devices. Typical external devices include wired/wireless headphones, external chargers, power supplies, earphones, microphones and storage devices configured to store data such as audio, video, and pictures. The interface unit 170 may be configured using a wired/wireless data port, audio input/output ports, video input/output ports, or a card socket for coupling to a memory card, a subscriber identity module (SIM) card, a user identity module (UIM) card, or a removable user identity module (RUIM) card).

The output unit 150 may include various components that support the output requirements of the mobile terminal 100. The display 151 may be implemented to visually display information associated with the mobile terminal 100. The display 151 may provide a user interface or graphical user interface that includes information associated with placing, conducting, and terminating a phone call if the mobile terminal 100 is operating in a phone call mode. As another example, the display 151 may additionally or alternatively display images associated with a video call mode or a photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152, which supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The output unit 150 is further shown having an alarm 153, which may signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration may be provided by the alarm 153 responsive to receiving user input at the mobile terminal 100 in order to provide a tactile feedback mechanism. It is understood that the various signals provided by the components of the output unit 150 may be separately performed, or performed using any combination of such components.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 shown in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage device.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals 100.

Figure 2:
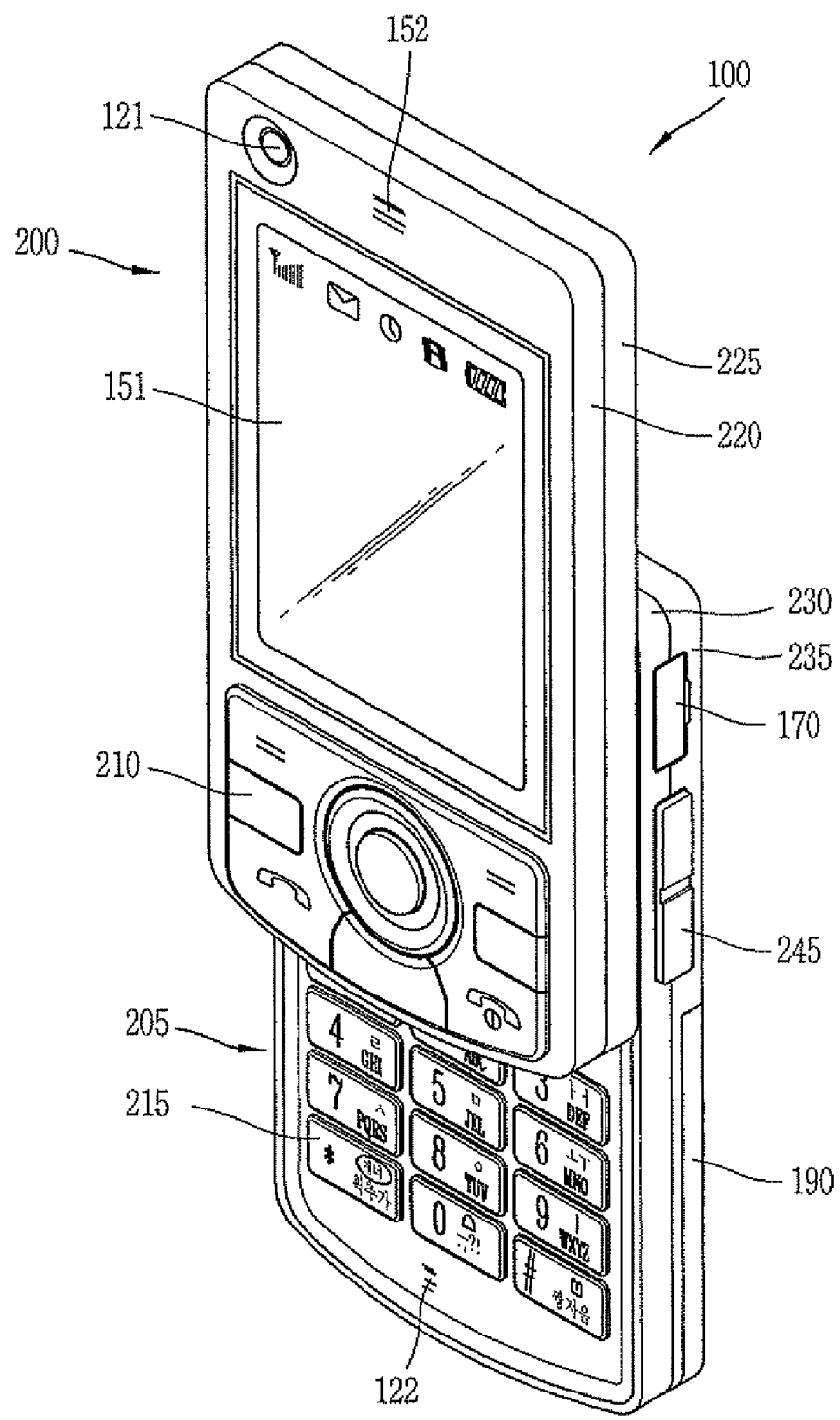
FIG. 2 is a front perspective view of the mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 (described in FIG. 1) is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, and otherwise operate the mobile terminal 100.

The first body 200 slides relative to the second body 205 between open and closed positions. The first body 200 is positioned over the second body 205 in the closed position such that the keypad 215 is substantially or completely obscured by the first body. User access to the keypad 215, the display 151 and the function keys 210 is facilitated in the open position. The function keys 210 are conveniently configured for a user to enter commands, such as start, stop and scroll.

The mobile terminal 100 is operable in either a standby mode or an active call mode. The mobile terminal 100 is able to receive a call or message and to receive and respond to network control signaling in the standby mode.

The mobile terminal 100 typically operates in the standby mode in the closed position and in the active mode in the open position. This mode configuration may be changed as required or desired.

The first body 200 is shown formed of a first case 220 and a second case 225. The second body 205 is shown formed of a first case 230 and a second case 235. The first cases 220, 230 and second cases 205, 235 are usually formed of a suitably rigid material, such as injection molded plastic, or formed using metallic material, such as stainless steel (STS) or titanium (Ti).

One or more intermediate cases may be provided between the first case 225 and second case 225 of the first body 200 or between the first case 230 and second case 235 of the second body 205. The first body 200 and second body 205 are typically sized to receive electronic components necessary to support operation of the mobile terminal 100.

The first body 200 is shown having a camera 121 and audio output module 152, which is configured as a speaker, positioned relative to the display 151. The camera 121 may be constructed such that it can be selectively positioned relative to first body 200, such as by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of user input unit 130, positioned along the side of second body. Preferably, the side keys 245 are configured as hot keys, such that the side keys are associated with a particular function of the mobile terminal 100.

An interface unit 170 is shown positioned adjacent to the side keys 245. A power supply 190 in a form of a battery is shown located on a lower portion of the second body 205.

Figure 3:
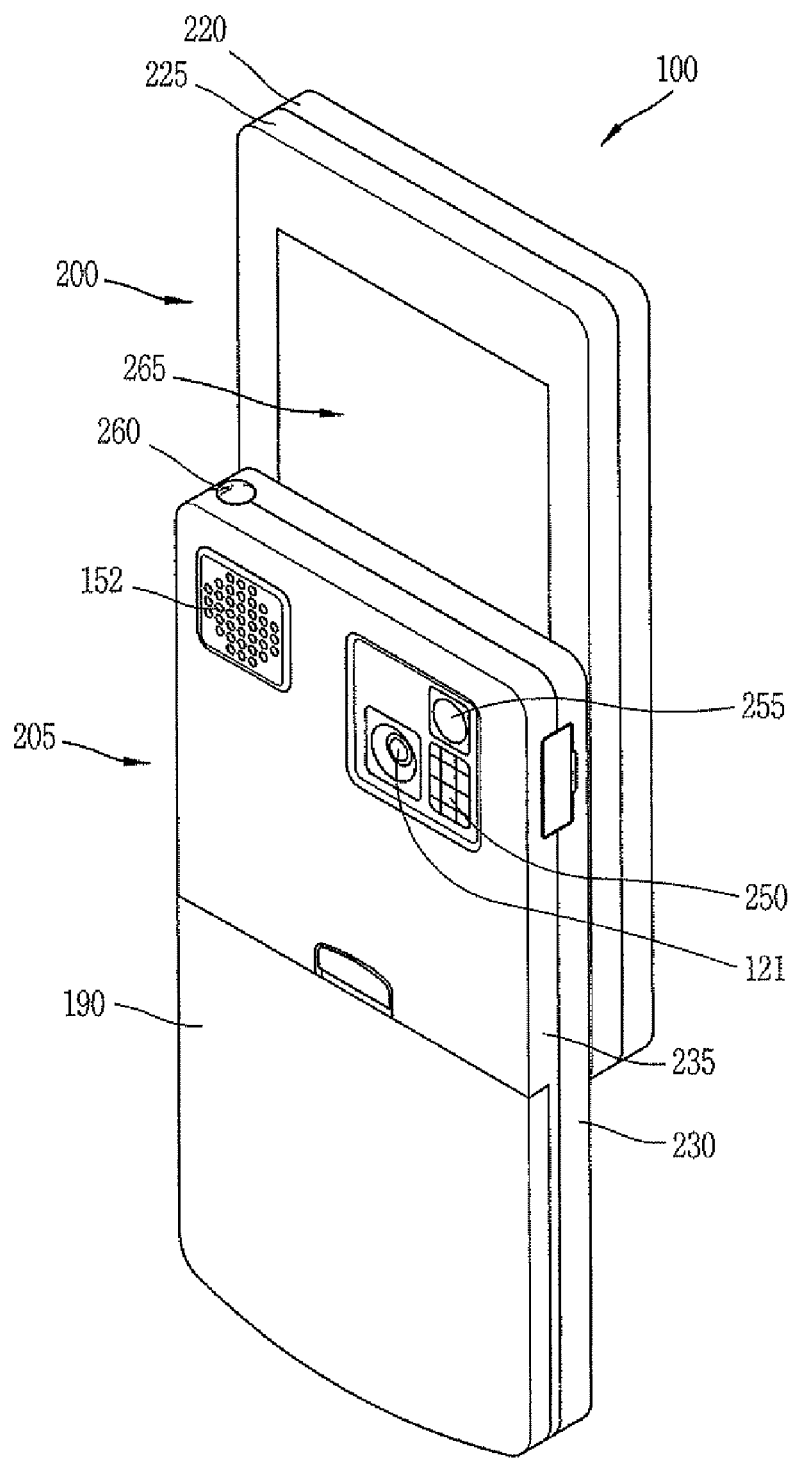
FIG. 3 is a rear view of the mobile terminal in FIG. 2.

FIG. 3 is a rear view of the mobile terminal shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 illustrated in FIG. 3 faces a direction opposite to a direction faced by the camera 121 of the first body 200 illustrated in FIG. 2. Each of the cameras 121 of the first body 200 and second body 205 may have the same or different capabilities.

The camera 121 of the first body 200 in one embodiment operates with a relatively lower resolution than the camera 121 of the second body 205. Such an arrangement works well during a video conference, for example, in which reverse link bandwidth capabilities may be limited. The relatively higher resolution of the camera 121 of the second body 205 is useful for obtaining higher quality pictures for later use or for communicating with other parties.

The second body 205 illustrated in FIG. 3 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205 in FIG. 3. The antenna 260 functions in cooperation with the broadcast receiving module 111 illustrated in FIG. 1. The antenna 260 may be fixed or retractable into the second body 205.

The rear side of the first body 200 includes a slide module 265. The slide module 265 slidably couples with a corresponding slide module located on the front side of the second body 205.

It is understood that the arrangement of the various components of the first body 200 and second body 205 illustrated in FIGS. 2 and 3 may be modified as required or desired. For example, some or all of the components of one body may be implemented in the other body. Further, the location and relative positioning of the components are not critical and, therefore, the components may be positioned at locations which differ from those shown in FIGS. 2 and 3.

The mobile terminal 100 of FIGS. 1-3 may be configured to operate within a communication system which transmits data via frames or packets, including both wireless and wired communication systems and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
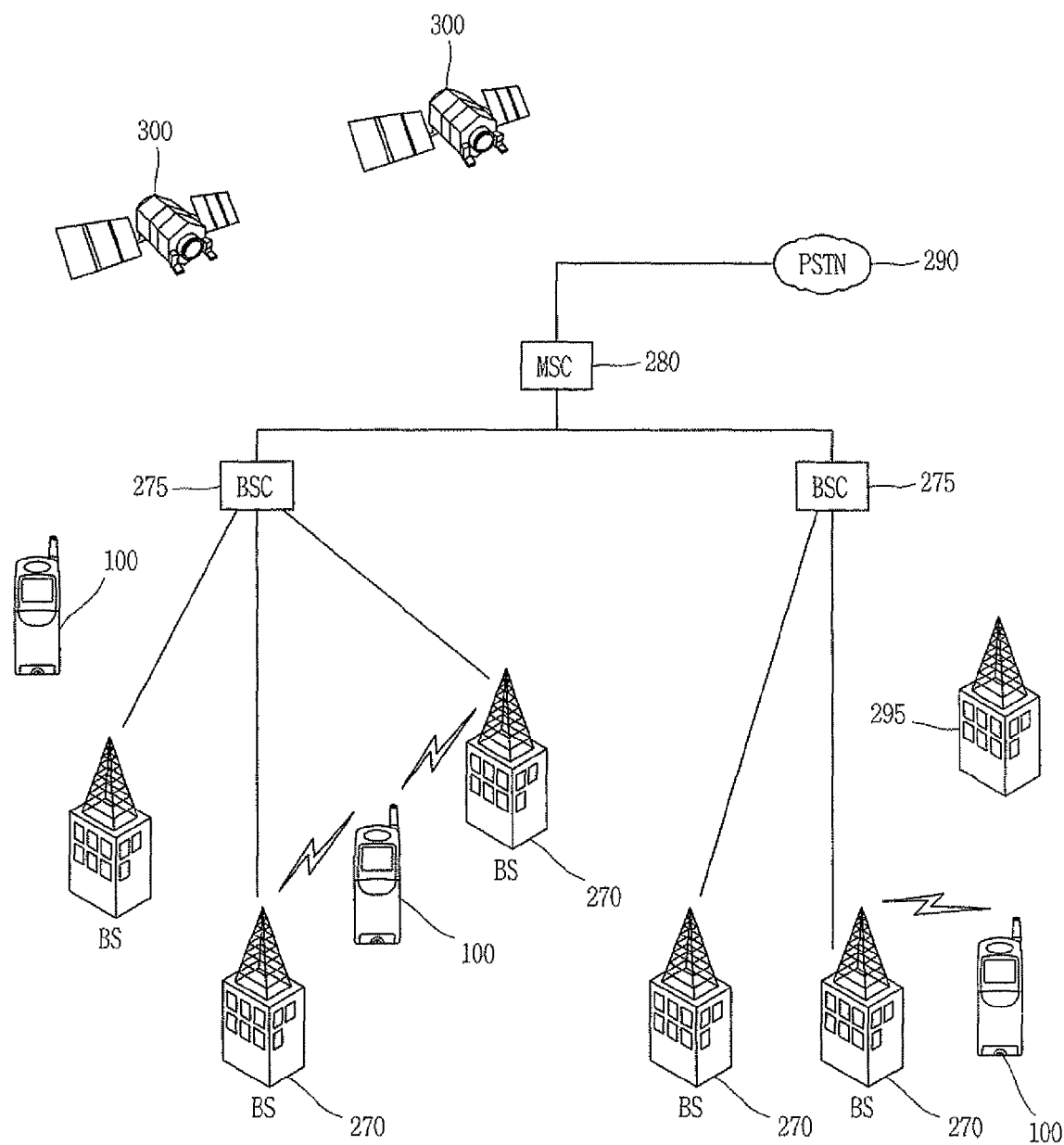
FIG. 4 is a block diagram of a wireless communication system operable with the mobile terminal according to an embodiment of the present invention.

Referring to FIG. 4, a CDMA wireless communication system is shown having a plurality of mobile terminals 100, a plurality of base stations (BS) 270, a plurality of base station controllers (BSC) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omni-directional antenna or an antenna pointed in a particular direction radially away from the base station. Alternatively, each sector may include two antennas for diversity reception. Each BS 270 may be configured to support a plurality of frequency assignments each having a particular spectrum, such as 1.25 MHz or 5 MHz.

The intersection of a sector and frequency assignment may be referred to as a CDMA channel. The BSs 270 may also be referred to as base station transceiver subsystems (BTSs).

The term "base station" may be used to refer collectively to a BSC 275 and one or more BSs 270. The BSs 270 may also be denoted as "cell sites." Alternatively, individual sectors of a given BS 270 may be referred to as "cell sites."

A terrestrial digital multimedia broadcasting (DMB) transmitter (BT) 295 is shown broadcasting to the mobile terminals 100 operating within the system. The broadcast receiving module 111 illustrated in FIG. 1 may be configured to receive broadcast signals transmitted by the BT 295. Similar arrangements may be implemented for other types of broadcast and multicast signaling as discussed above.

FIG. 4 further depicts several global positioning system (GPS) satellites 300 that facilitate locating the position of some or all of the mobile terminals 100. Two satellites 300 are depicted, but it is understood that useful positioning information may be obtained with greater or fewer satellites.

The position-location module 115 illustrated in FIG. 1 may be configured to cooperate with the satellites 300 to obtain desired position information. It is to be appreciated that other types of position detection technology may alternatively be implemented, such as location technology that may be used in addition to or instead of GPS location technology. If desired, some or all of the GPS satellites 300 may alternatively or additionally be configured to provide satellite DMB transmissions.

During typical operation of the wireless communication system, the BSs 270 receive sets of reverse-link signals from various mobile terminals 100. The mobile terminals 100 perform calls, messaging, and other communications.

Each reverse-link signal received by a given BS 270 is processed within that BS. The resulting data is forwarded to an associated BSC 275.

The BSC 275 provides call resource allocation and mobility management functionality including soft handoffs between the BSs 270. The BSCs 275 also route the received data to the MSC 280, which provides additional routing services for interfacing with the PSTN 290.

Similarly, the PSTN 290 interfaces with the MSC 280, which interfaces with the BSCs 275. The BSCs 275 control the BSs 270 to transmit sets of forward-link signals to the mobile terminals 100.

According to an embodiment of the present invention, the mobile terminal 100 is paired with and used with a plurality of portable wireless devices. Referring to FIG. 5, a plurality of paired wireless devices, such as a wireless headset (headset 1 310, headset 2 311, and headset 3 312), a wireless speaker, and a wireless ear set, selectively connect to a mobile terminal 100 to perform call communication, or to transmit or receive audio signals generated by the mobile terminal reproducing multimedia contents.

The controller 180 of the mobile terminal 100 enters a mode in which the wireless devices near the mobile terminal can be connected to the mobile terminal according to user manipulation of input interface. In a wireless device connection mode, the controller 180 outputs a wireless device search screen image or a wireless device pairing screen image through the display unit 151.

In the wireless device search screen, wireless devices, for example, wireless headsets, which are near the mobile terminal 100, are searched among various wireless devices and displayed. Further, in the wireless device paring screen, a particular wireless device, among the searched wireless devices, such as a wireless headset, to be wirelessly connected with the mobile terminal 100, is registered in a pairing list, or a previously registered pairing list listing the paired wireless devices may be displayed.

In general, in order for the mobile terminal 100 to be connected to the particular wireless device, a PIN (Personal Identification Number) code or a password of the wireless device should be input for each connection. However, once the PIN code or the password of the particular wireless device, such as a particular wireless headset, is registered with the mobile terminal 100 in the paring list, the particular wireless headset registered in the pairing list can be automatically connected the next time the mobile terminal needs to be connected to the particular wireless headset.

If the particular wireless device, such as the wireless headset registered in the pairing list, is located within a range to be connected to the mobile terminal 100, wireless connection may be automatically established between the wireless headset and the mobile terminal. After the particular wireless device is selected by the user, if a connection key is input by a touch or a button, the controller 180 may wirelessly connect the selected particular wireless device and the mobile terminal 100 by using the information registered in the pairing list.

As shown in FIG. 5, the controller 180 may control the short-range communication module 114 to search or connect a particular type of wireless device, such as a wireless headset, which is located near the mobile terminal 100. In order to search the particular type of wireless device, the controller 180 turns on the short-range communication module 114 such that the short-range communication module 11 searches the particular type of wireless device which is near the mobile terminal 100. The controller 180 may recognize information about MAC (Media Access Control) addresses, names, CoDs (Class of Devices), RSSI (Received Signal Strength Indicator) of various wireless devices from signals received via the short-range communication module 114.

Figure 6A:
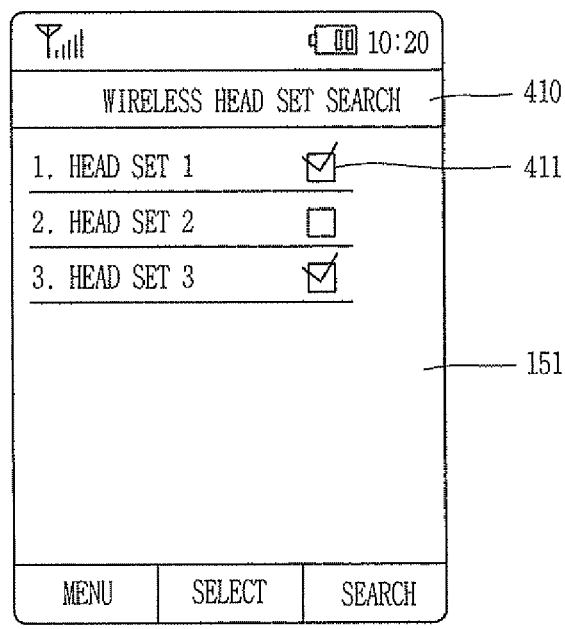
FIG. 6A shows a screen image of a wireless headset search in the mobile terminal according to an embodiment of the present invention.

As shown in FIG. 6A, only a particular type of wireless devices, such as wireless headsets '1. HEAD SET 1,' 'HEAD SET 2,' and 'HEAD SET 3,' may be detected among various types of wireless devices and displayed on the wireless head set search screen 410. A plurality of wireless devices displayed on the wireless head set search screen are registered in a paring list according to a user's selection. The user may select two searched wireless headsets, '1. HEAD SET 1' and 'HEAD SET 3.' The selected wireless headsets are indicated by an indicator 411 such as a check (√) mark. Then, the selected wireless headsets, '1. HEAD SET 1' and 'HEAD SET 3' are registered in the pairing list through manipulation of user interface.

Figure 6B:
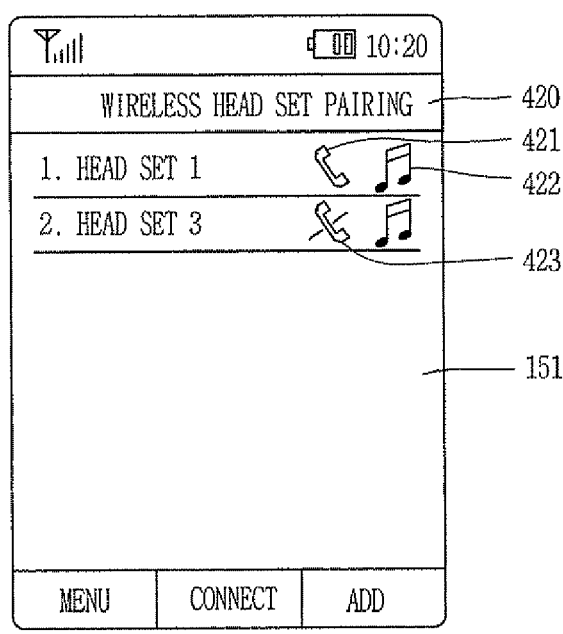
FIG. 6B shows a screen image of a wireless headset paring list in the mobile terminal according to an embodiment of the present invention.

Referring to FIG. 6B, types of audio signals to be transmitted or received are set for respective wireless devices registered in the pairing list 420. In addition, a wireless device to which a call may be connected is set. For example, among the plurality of wireless devices registered in the pairing list 420, a call function 421 and a multimedia contents reproducing function 422 may be set for headset 1 and only the multimedia contents reproducing function 422 may be set for headset 3.

The function set for each wireless device may be indicated by indicators 421, 422, 423, each having a particular shape. For example, the indicator 421 indicates that a call function has been set for headset 1. Thus, call communication can be performed by headset 1, as indicated by the indicator 421. The indicator 423 indicates that a call function has not been set for headset 3. Thus, call communication cannot be performed by the wireless device, headset 3, as indicated by the indicator 423. The indicator 422 indicates that sound or audio signals, which are generated from reproduction of multimedia contents, such as music, video, and TV broadcasting, can be output by the paired headsets 1 and 3.

Figure 7:
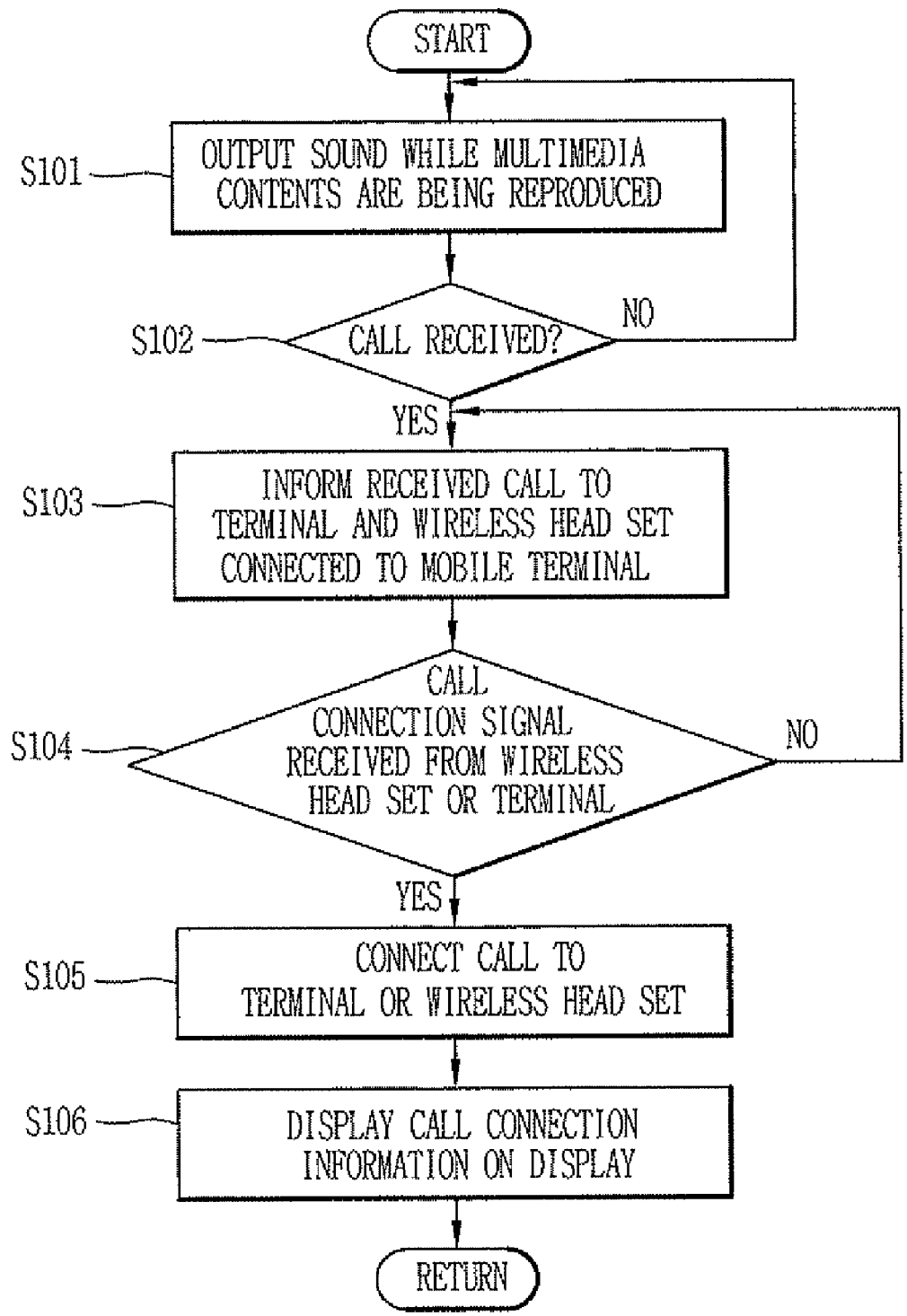
FIG. 7 is a flowchart illustrating a method of performing call communication while a plurality of wireless headsets are connected to the mobile terminal according to an embodiment of the present invention.

The method of performing call communication through a plurality of paired wireless devices will now be described. Referring to FIG. 7, multimedia contents, such as music, video, and TV broadcasting, are reproduced by the mobile terminal 100 and the sound from the reproduced multimedia contents is output via the plurality of wireless devices which are wirelessly connected to the mobile terminal (S101).

Figure 10A:
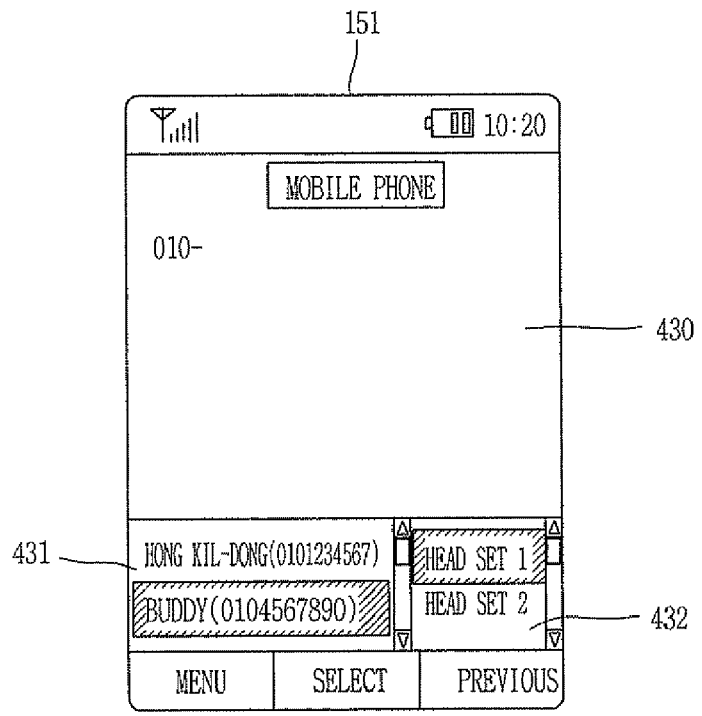
FIG. 10A shows a screen image illustrating a method of directly inputting a phone number to and originating a call from the mobile terminal according to an exemplary embodiment of the present invention.
Figure 10B:
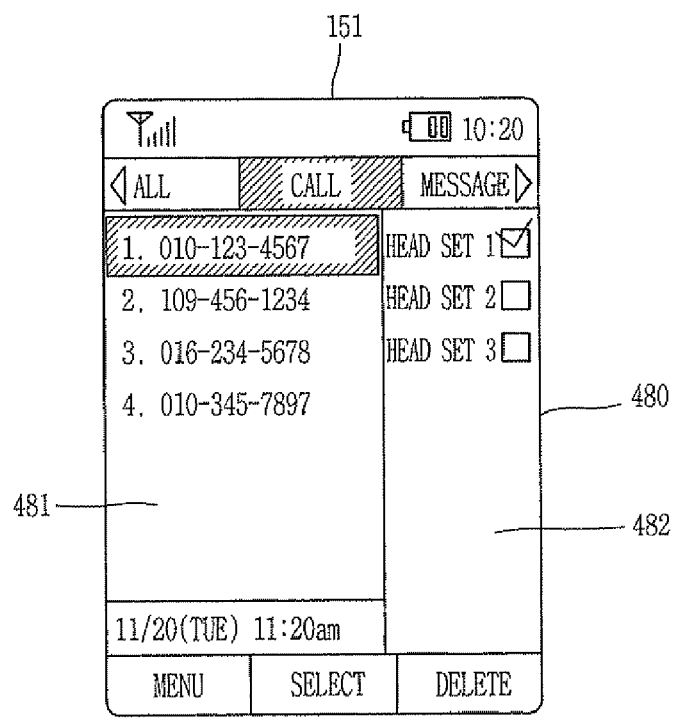
FIG. 10B shows a screen image illustrating a method of searching recently communicated phone numbers by the mobile terminal and originating a call to one of the communicated phone numbers according to an embodiment of the present invention.
Figure 10C:
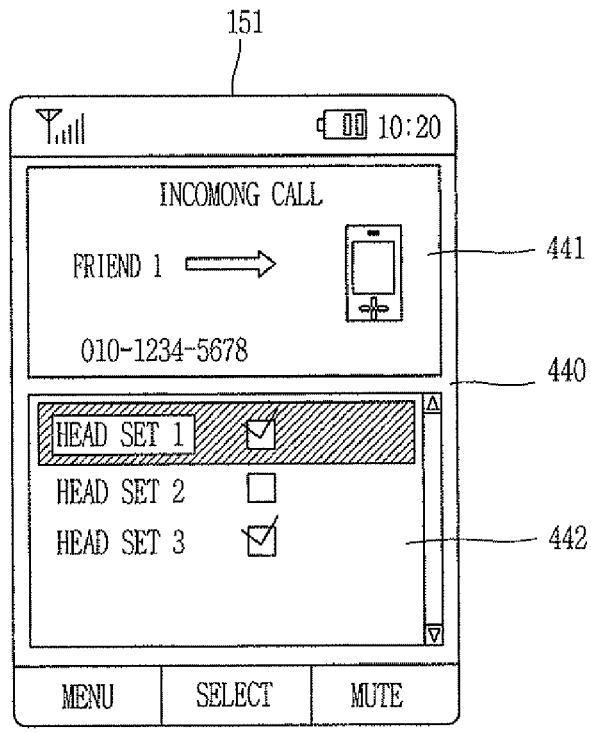
FIG. 10C shows a screen image illustrating a method of selecting a wireless headset and connecting a received call to the selected wireless headset by the mobile terminal according to an embodiment of the present invention.

If a call is received while the multimedia content is being reproduced and output via the plurality of wireless devices (S102 YES), as shown in FIG. 10C, the controller 180 displays caller information 441 on the display unit 151 and informs the incoming call through the alarm unit 153 of the mobile terminal 100 or by transmitting an alarm signal to the plurality of wireless devices which are wirelessly connected to the mobile terminal (S103).

The controller 180 may transmit the alarm signal only to one or more particular wireless devices set as default. Alternatively, the alarm signal may be transmitted only to the wireless devices set for the call communication function, for example, headset 1 shown in FIG. 6B. When each wireless device is informed of the incoming call and the user inputs a particular key, such as a key for call connection, each wireless device may output a call connection signal to the mobile terminal 100. Then, the mobile terminal 100 receives the call connection signals from the wireless devices via the short-range communication module 114.

Upon receiving the call connection signal via the short-range communication module 114 (S104), the controller 180 connects the call to the wireless device which has output the call connection signal or the mobile terminal 100 (S105). As shown in FIG. 10C, the controller 180 may output a wireless device select screen image 442 together with the caller information 441 on the display unit 151. Then, the controller 180 connects the call to the plurality of selected wireless devices upon receiving an input via a button or user's touch on the touch screen. The information displayed on the wireless device select screen image 442 may be displayed by using distinct text, image or color such that each wireless headset is easily discriminated.

Figure 10D:
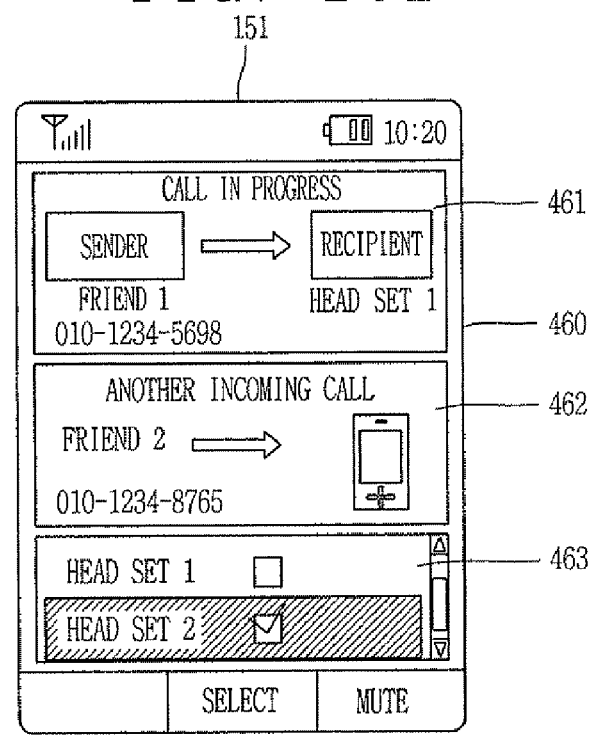
FIG. 10D shows a screen image illustrating a method of selecting a wireless headset and connecting a second call to the selected wireless headset when the second call is received while a first call is in communication with another wireless headset via the mobile terminal according to an embodiment of the present invention.
Figure 10E:
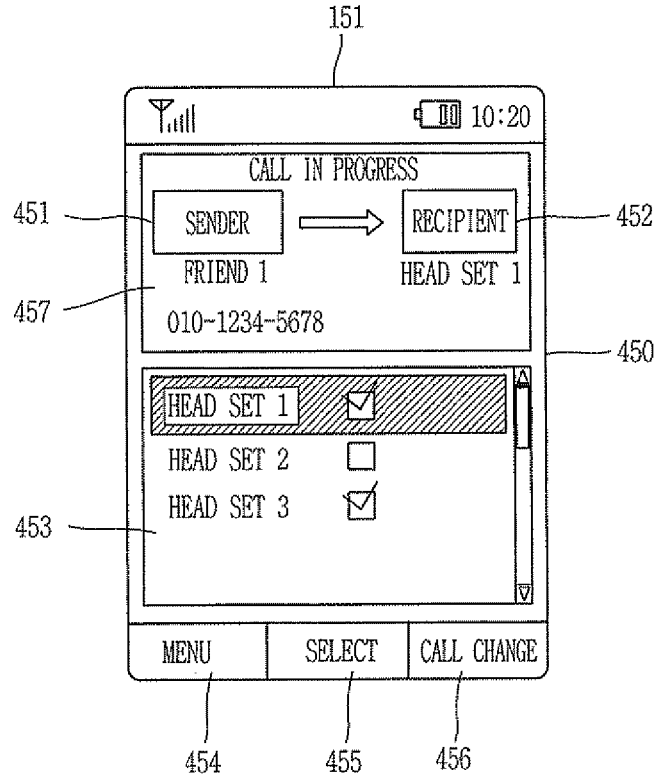
FIG. 10E shows a screen image illustrating a method of switching a particular wireless headset being used for communication via the mobile terminal to a different wireless headset according to an embodiment of the present invention.
Figure 10F:
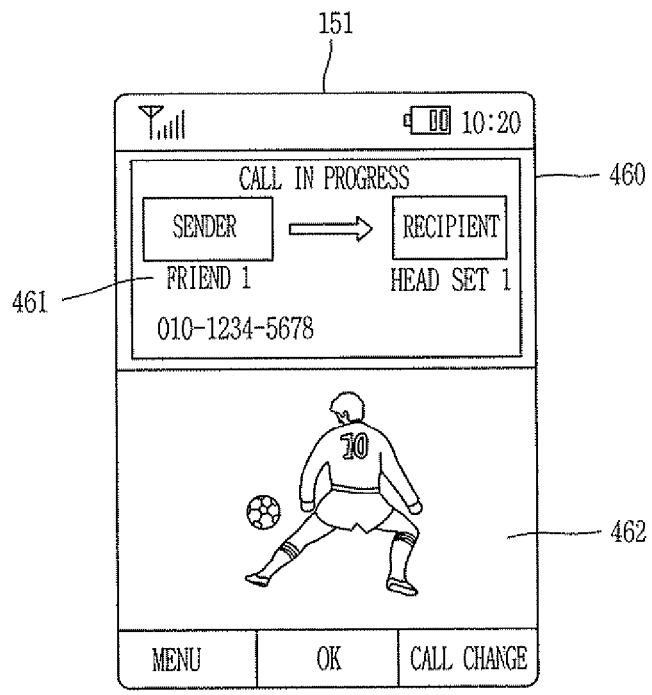
FIG. 10F shows a screen image illustrating a method of simultaneously performing call communication and executing a different kind of operation by using a plurality of wireless headsets via the mobile terminal according to an embodiment of the present invention.

When the call is connected to the particular wireless device, the controller 180 displays the call connection information 457, 461 on the display unit 151 (S106), as shown in FIG. 10E or 10F. The call connection information 457, 461 may include the caller information 451 and information 452 regarding the connected wireless device.

In addition, the controller 180 may divide the display region of the display unit 151 into two regions and display the call connection information 457 at one region and a list 453 of wireless devices available for call communication at the other region, as shown in FIG. 10E. Alternatively, the controller 180 may display the call connection information 461 at one region and an operational screen image 462 at the other region, as shown in FIG. 10F. For example, the operational image may be a video or broadcasting which had been being executed when the call was received or connected.

In the present invention, various types of graphical user interface (GUI) formats may be implemented. Instead of dividing the display region on a single screen, different types of information may be shown on multiple display screens, for example, on a dual-display mobile phone. Alternatively, the display unit 151 may allow different types of information to be displayed in an overlapping manner, via pop-up windows, or with translucent effects. In addition to such visual information output via the display unit 151, audible outputs, such as sounds or music, and/or tactile outputs, such as vibrations, tactile feedback, or haptic responses, may also be implemented.

Figure 8:
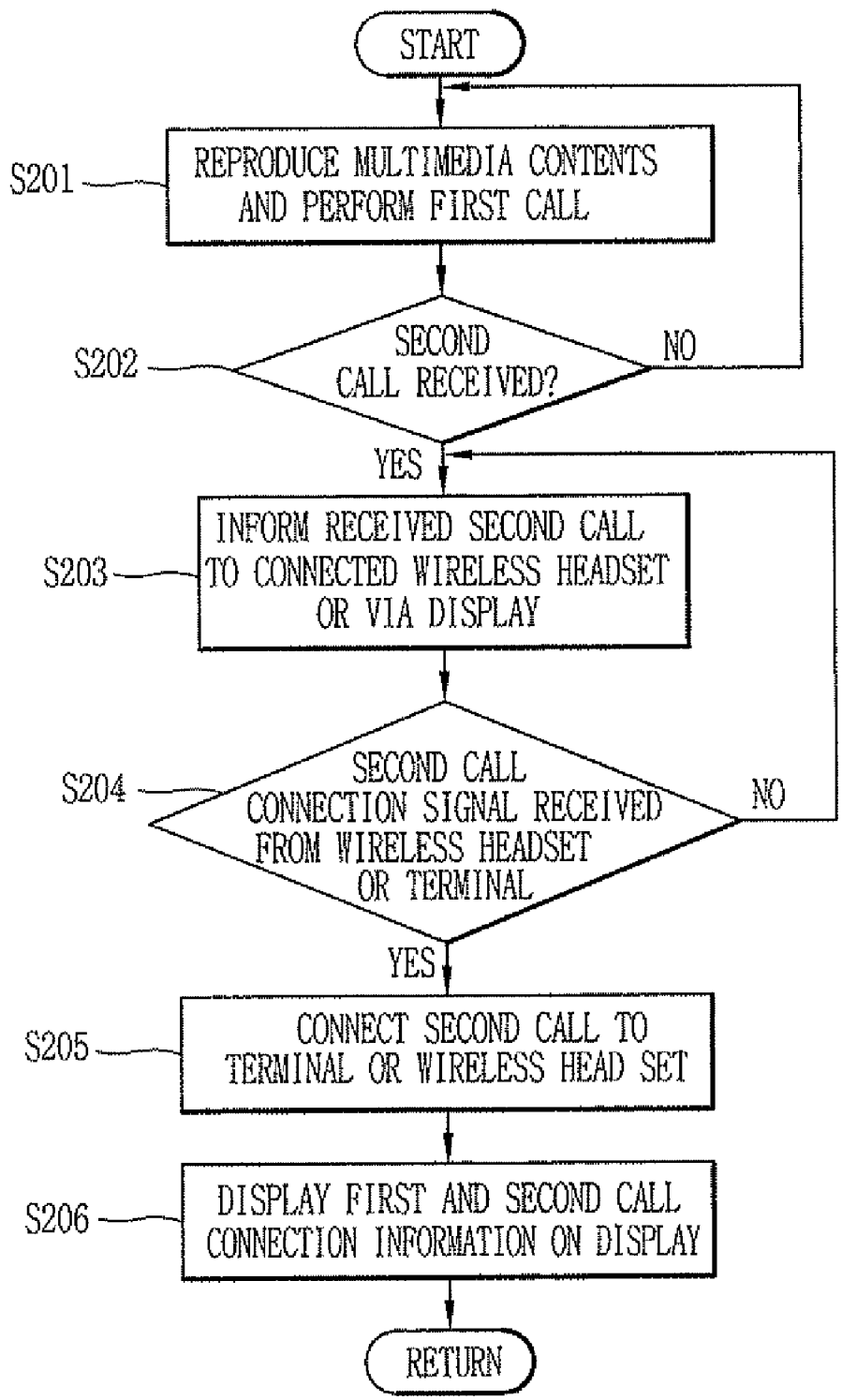
FIG. 8 is a flowchart illustrating a method of connecting a plurality of wireless headsets to the mobile terminal and each of the plurality of wireless headsets performing call communication with each of a plurality of incoming callers according to an embodiment of the present invention.

The method for connecting a call to a plurality of incoming callers by using the plurality of wireless devices connected to the mobile terminal 100 will now be described. Referring to FIG. 8, the mobile terminal 100 reproduces the multimedia contents, such as music, video, or TV broadcasting, and transmits sound output from the reproduction of the multimedia to the plurality of wireless devices which are wirelessly connected to the mobile terminal while call communication is being performed via a particular wireless device or the mobile terminal (S201).

If another incoming call or a 'second call' is newly received while the previous call communication or a 'first call' is being performed via the particular wireless device (S202), as shown in FIG. 10D, the controller 180 also displays second caller information 462 regarding the newly received second call in addition to the first call connection information 461 regarding the first call on the display unit 151. Further, the controller 180 may inform that the second call has been received via the alarm unit 153 of the mobile terminal 100 or by transmitting an alarm signal to the wireless devices which are wirelessly connected to the mobile terminal (S203). The incoming call may also be informed to the wireless device which is engaged in the first call communication. The second call may be an Internet call, such as VoIP (Voice over Internet Protocol) via the Internet or a data communication network, CDMA, GSM or the UMTS.

The wireless devices that can be informed about the second incoming call may be limited to wireless devices for which the call communication function has been set, for example, headset 1 shown in FIG. 6B. The user of each wireless device, which has been informed of the second incoming call, engages in the communication by pressing a call button provided at each wireless device. Then, the wireless device outputs call connection signals to the mobile terminal 100. The mobile terminal 100 receives the signals transmitted from the wireless device via the short-distance communication module 114 to connect the second call to the wireless device.

Upon receiving the second call connection signals via the short-range communication module 114 (S204), the controller 180 connects the second call to the wireless device from which the second call connection signals was transmitted (S205). Further, when the second call is received while the first call is being communicated, as shown in FIG. 10D, the second caller information 462 regarding the second call may be displayed together with the first call connection information 461 indicating that the first call was received from 'BUDDY 1' and is being communicated via headset 1. In addition, a wireless device select screen image 463 may be displayed such that a wireless device can be selected from a list of available wireless devices to connect the second call to a wireless device selected by receiving button input or a touch input via touch screen. The information displayed on the wireless device select screen image 463 may be displayed by using at least one of distinct text, image and color to distinguish the respective wireless headsets easily.

If the wireless device, such as headset 1, which is currently engaged in or being used for the first call, is selected among the selected wireless devices, the second call may be connected to the headset 1 while maintaining the first call connection, or the first call connection may be disconnected from headset 1 while the second call is connected to headset 1.

Figure 10G:
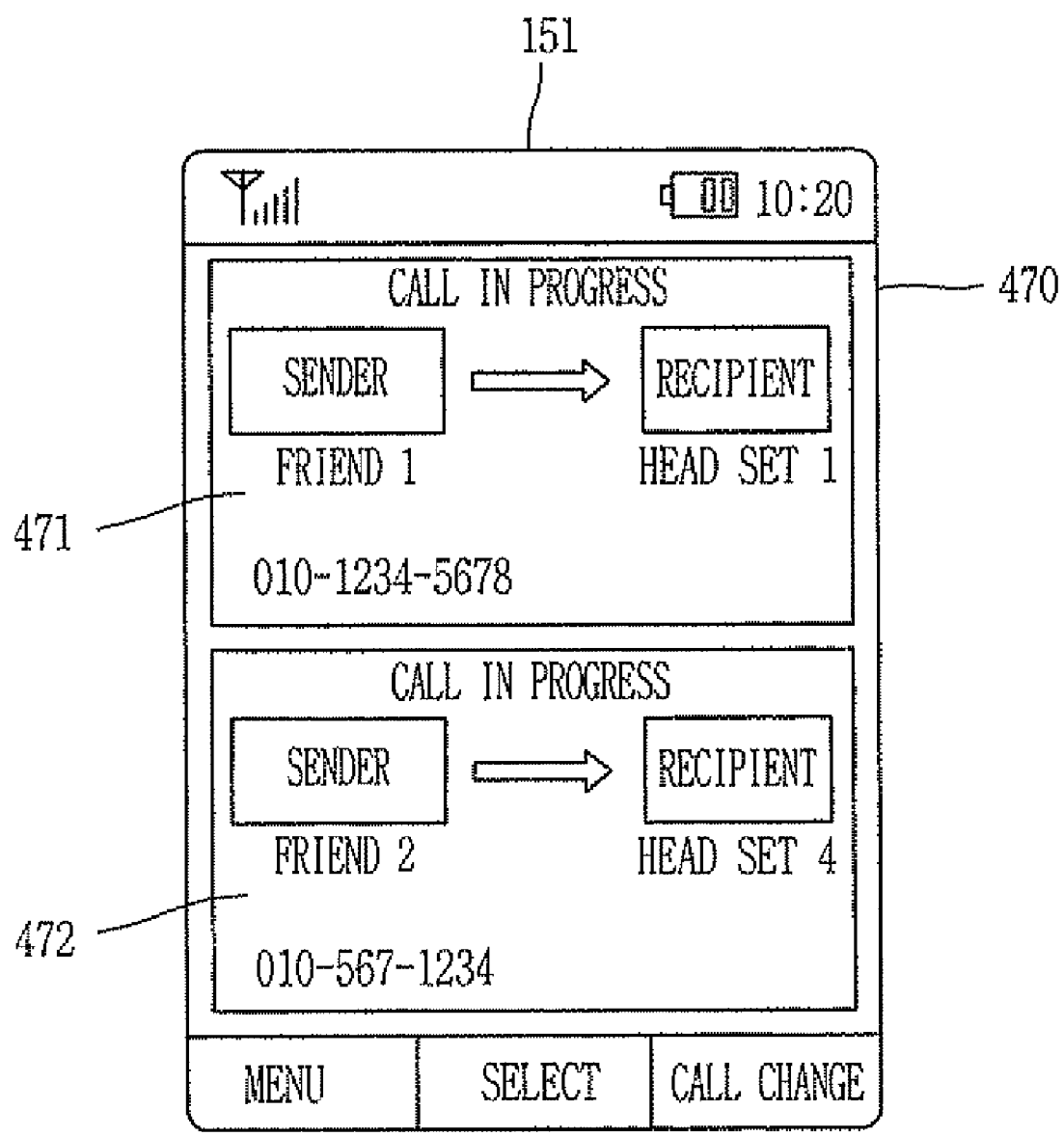
FIG. 10G shows a screen image illustrating a method of simultaneously performing a plurality of call communications by using a plurality of wireless headsets via the mobile terminal according to an embodiment of the present invention.

When the second call is connected, the controller 180 may display the first call connection information 461, 471 and second call connection information 472 on the display unit 151, as shown in FIG. 10G (S206). The call connection information 461, 471 and 472 may include incoming caller information and information about the wireless device engaged in the call communication.

Upon activation of a function for receiving/sending multiple calls or other types of communications, such as text messages, e-mail, data transfer, and file downloading, the user may handle one or more calls while at least one previous call communication is in progress. Such function is referred to as a "call changing" function.

For example, when a key, such as a soft key or a hardware key, is input for call changing, the controller 180 may divide the display region of the display unit 151 and display the list 463, 453 of the wireless devices that are available for call connection, as shown in FIGS. 10D and 10E. Therefore, the plurality of calls are connected by using the wireless devices connected to the mobile terminal 100.

Figure 9:
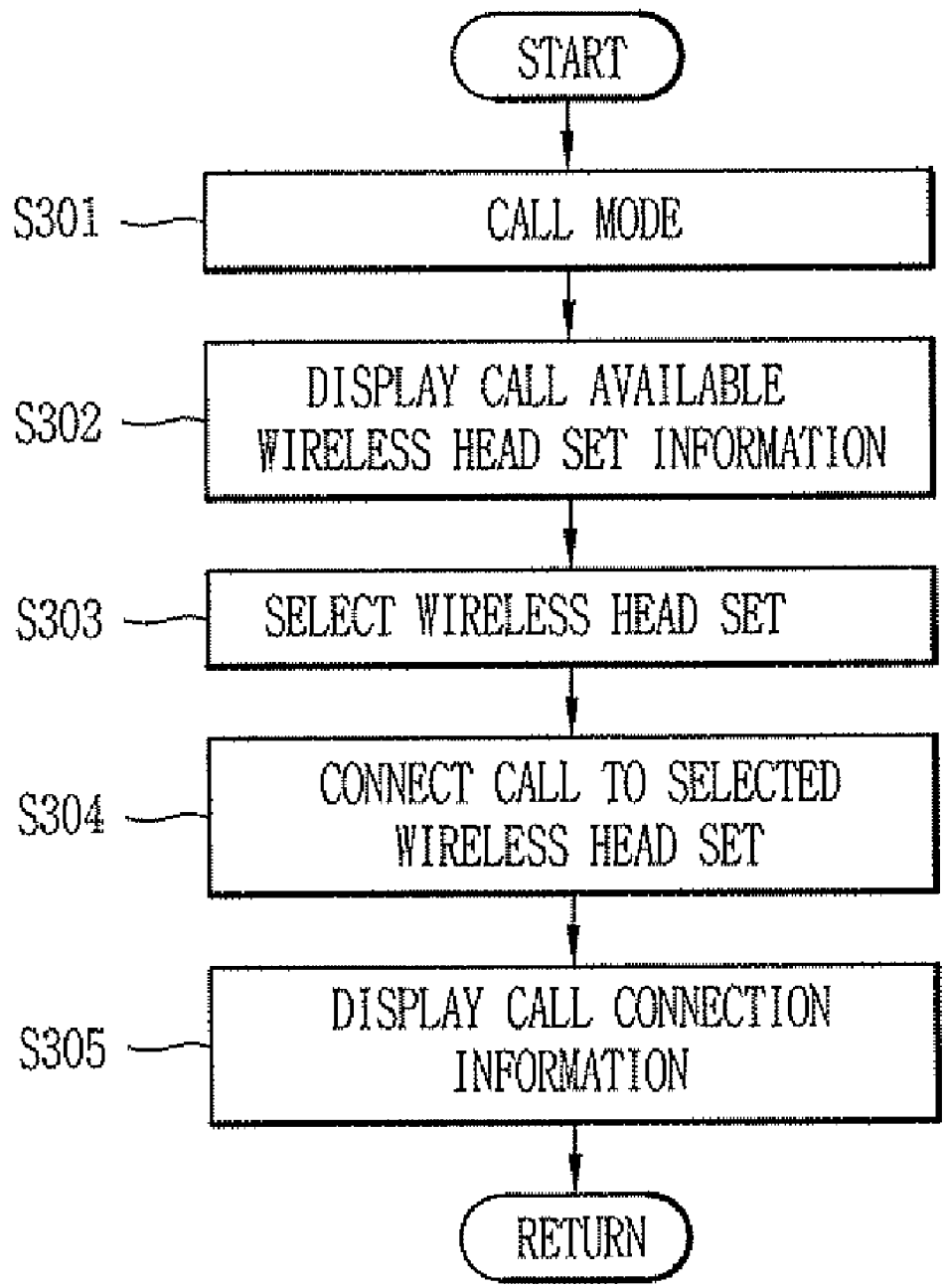
FIG. 9 is a flowchart illustrating a method of changing a call connection from one wireless headset to another wireless headset, among the plurality of wireless headsets connected to the mobile terminal according to an embodiment of the present invention.

Now, a method of changing a call connection from one wireless headset to another wireless headset will be described. Referring to FIG. 9, the mobile terminal 100 is wirelessly connected with a particular wireless device to perform call communication (S301).

When the mobile terminal 100 performs the call communication with the particular wireless device, the controller 180 may divide the display region of the display unit 151 into at least two regions and displays the call connection information at one region 461 and the previously performed operation, for example, multimedia playback output, at the other region 462, as shown in FIG. 10F. While the call communication is being performed by using the particular wireless device, if a user wants to switch the call connection to a different wireless device, or if the call is additionally connected to a different wireless device to perform multi-party call communication, the user inputs a key 456, such as soft key or hardware key, for call changing, as shown in FIGS. 10E, 10F and 10G.

When the key 456 for call changing is input, the controller 180 outputs the wireless device select screen image 453. The wireless device select screen image 453 shows wireless devices configured for the call communication function and the wireless devices may be displayed leveling the order of priority. The information displayed on the wireless device select screen image 453 may be displayed by using at least one of distinct text, image, and color such that a plurality of wireless headsets are easily distinguishable.

When the wireless devices available for call connection are displayed in a list, the user selects at least one desired wireless device and inputs a call key, such as soft key or hardware key. Besides the wireless device (headset 1) that is currently engaged in the call communication, if a different wireless device (headset 3) is additionally selected, multi-party call communication can be performed. Alternatively, if only the different wireless device (headset 3) is selected, excluding the wireless device (headset 1) currently engaged in call communication, a call change is made to headset 3 (S304). When the call change or the multi-party call communication is performed, the controller 180 may display the entire call connection information 461, 471 and 472 on the display unit 151, as shown in FIGS. 10F or 10G (S305).

Now, a method of receiving a call or originating a call by the mobile terminal to which the plurality of wireless devices are connected will be described. Referring to FIG. 10A, the controller 180 may divide a screen region of the display unit 151 into two or more regions and display a phone number which is input by the user, for example, '010-,' at one region 430. As the user inputs the phone number to place a call, a phone book is searched to locate phone numbers starting with the partially input phone number '010-' and display phone numbers starting with the same at one region 431 while a phone number is being input. As more digits of the phone number are input in addition to '010-', phone numbers not matching the input digits disappear from the display. Therefore, the user may select the phone number in the list to place a call if the phone number is available from the list, rather than inputting the entire digits of the phone number.

In addition, a list of wireless devices available for call connection is displayed at another region 432. When the user selects a particular wireless device and inputs the call key, such as soft key or hardware key, the controller 180 connects the call to the selected wireless device.

Referring to FIG. 10B, the controller 180 may divide the screen region 480 of the display unit 151 into at least two regions and displays a list of phone numbers with which call communication has been performed lately at one region 481 and a list of wireless devices available for call connection at another region 482. When the user selects a particular wireless device from the list of wireless devices and inputs a call key, the controller 180 connects a call to the selected wireless device. For example, headset 1 is selected to be connected for the call in FIG. 10B.

Referring to FIG. 10C, the controller 180 may divide a screen region 440 of the display unit 151 into at least two regions and when a call is received, the controller 180 displays caller information at one region 441 and a list of wireless devices available for call connection at another region 442. When the user selects a particular wireless device and inputs a call key, the controller 180 connects the call to the selected wireless device.

The particular wireless device to be connected for call communication may have been previously set as a default. In this case, an alarm signal indicating a call reception may be transmitted only to the default wireless device. Or, the controller 180 may connect a wireless device that requests call connection first to the call communication among the wireless devices to which the alarm signal has been transmitted. Alternatively, the controller 180 may connect not only one but also all the wireless devices that request call connection to the call communication. The request for call connection are made by the respective wireless devices by transmitting a particular signal for call connection to the mobile terminal 100.

Referring to FIG. 10D, the controller 180 may divide a screen region of the display unit 151 into at least three regions and display first caller information regarding the currently connected first call at one region 461 and second caller information regarding a newly received second call at another region 462. In addition, the controller 180 may display a list of wireless devices available for call connection at region 463. When the user selects a particular wireless device to be connected and inputs the call key, the controller 180 connects the second call to the selected wireless device. Alternatively, the controller 180 may connect the second call to a plurality of wireless devices that request call connection.

Referring to FIG. 10E, the controller 180 may divide a screen region of the display unit 151 into at least two regions and displays information regarding the first caller and the wireless device that is currently in call communication at one region 457 and a screen image generated from another operation at another region 453, as shown in FIG. 10F. If a particular key 456 'CALL CHANGE' is input to change call connection, the controller 180 displays a list of the wireless devices available for call connection instead of the screen image from another operation, as shown in FIG. 10E. When the user selects a particular wireless device and inputs the call key, such as soft key or hardware key, the controller 180 changes call connection to the selected wireless device.

Referring to FIG. 10F, the controller 180 may divide a screen region of the display unit 151 into at least two regions and displays information regarding the caller 'BUDDY 1' currently in call communication and the wireless device 'HEAD SET 1' at one region 461 and a screen image from the operation presently being performed at another region 462.

The screen image displayed at another region 462 may be images reproduced from multimedia contents, such as video and broadcasting.

If a particular key, such as CALL CHANGE, is selected to change call connection while the call communication and the multimedia contents reproduction operation are simultaneously being performed, the list of wireless devices available for call connection is displayed at one of the two regions 461, 462. For example, the operation screen image 462 in FIG. 10F may be replaced by the list of wireless devices 453 shown in FIG. 10E.

Referring to FIG. 10G, the controller 180 may divide a screen region 470 of the display unit 151 into at least two regions and displays a plurality of caller information currently in call communication including information regarding the wireless devices engaged in each call communication at each region. If a plurality of call communications, for example, a first call which is a CDM call and a second call which is a VoIP call, are performed in turn by using a single wireless device, one region displays one of the two calls as a standby state and the other region displays the other call as in communication state. Indicators may be displayed to indicate either the standby state or in communication state. In this case, the controller 180 may receive a touch input or external input via a particular button provided on the mobile terminal 100 or the wireless device to switch between the call in the standby state and the call in communication state.

In the present invention, when a call is received while multimedia contents are being reproduced, the call may be connected to at least one of wireless devices or a call connection may be connected to a different wireless device which is not being used to receive the multimedia output. If the call was connected to a wireless device which has been used to receive signals reproduced from the multimedia contents, when the call connection is terminated, the signals which have been transmitted or received before the call connection may be continuously transmitted or received.

In this case, the controller 180 may temporarily stop reproducing the multimedia contents selectively, and then reproduces from the stopped point of the multimedia contents when resumed. Alternatively, the controller 180 may prompt to stop or pause the multimedia reproduction before the call is connected. The controller 180 may also prompt to resume or stop after the call is disconnected from the wireless device which was previously used to receive the signals reproduced from the multimedia contents.

Alternatively, while continuing reproduction of the multimedia contents, the controller 180 may continue transmitting the reproduced audio signals to a different wireless headset not engaged in the call. For example, if two radio channels can transmit audio signals, the controller 180 may transmit/receive audio signals related to call communication via one radio channel and transmit audio signals related to the multimedia contents via another radio channel.

The above-described methods can be implemented in a program recorded medium as computer-readable codes. The computer-readable media include all kinds of recording devices in which data readable by a computer system are stored. For example, the computer-readable media include ROM, RAM, CD-ROM, magnetic tapes, floppy discs, optical data storage devices, and the like and also include carrier-wave type implementations (e.g., transmission via Internet). And, the computer can include the control unit 180 of the mobile terminal.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A mobile terminal comprising:
a short range communication module; and
a controller configured to:
pair with a plurality of short range portable wireless devices communicatively coupled with the mobile terminal, wherein the plurality of short range portable wireless devices comprise a first short range portable wireless device and a second short range portable wireless device;
simultaneously forward multi-media data to the first short range portable wireless device and the second short range portable wireless device when the multi-media data is processed by the mobile terminal;
forward a notification of an incoming call to the first short range portable wireless device in response to a receipt of the incoming call; and
establish a voice communication link with the first short range portable wireless device to process the incoming call in response to an input thereof, wherein the second short range portable wireless device is configured to seamlessly process the multi-media data while the first short range portable wireless device is in the voice communication link with the mobile terminal.

2. The mobile terminal of claim 1, wherein the controller is preconfigured to establish the voice communication link with the first short range portable wireless device among the plurality of short range portable wireless devices.

3. The mobile terminal of claim 2, wherein the controller is further configured to establish an additional voice communication link with the second short range portable wireless device to process the incoming call in response to an input thereof.

4. The mobile terminal of claim 2, wherein the controller is further configured to establish an additional voice communication link with the second short range portable wireless device to process an additional incoming call in response to an input thereof.

5. The mobile terminal of claim 2, wherein the controller is further configured to switch the voice communication link from the first short range portable wireless device to the second short range portable wireless device in response to an input thereof.

6. The mobile terminal of claim 1, wherein the controller is preconfigured to forgo the voice communication link with the second short range portable wireless device.

7. The mobile terminal of claim 1, further comprising a display unit.

8. The mobile terminal of claim 7, wherein the controller is further configured to display on the display unit information related to the incoming call and the first short range portable wireless device.

9. The mobile terminal of claim 7, wherein the controller is further configured to display on the display unit an option to switch the call to at least one of the plurality of short range portable wireless devices sans the first short range portable wireless device.

10. The mobile terminal of claim 9, further comprising a touch screen integrated to the display unit, wherein the touch screen is configured to receive an input selecting the at least one of the plurality of short range portable wireless devices sans the first short range portable wireless device.

11. The mobile terminal of claim 10, further comprising an input unit, wherein the controller is further configured to process the input for connecting the voice communication link with the first short range portable wireless device when the input is received via the input unit.

12. The mobile terminal of claim 11, wherein the input comprises a touch on the touch screen.

13. The mobile terminal of claim 11, wherein the input is generated by an acknowledge signal forwarded from the first short range portable wireless device.

14. The mobile terminal of claim 1, wherein the notification comprises an alert sound.

15. The mobile terminal of claim 1, wherein the plurality of short range portable wireless devices comprise a BLUETOOTH device.

16. A method performed by a mobile terminal communicating with short range wireless devices, the method comprising:
  pairing with a plurality of short range portable wireless devices communicatively coupled with the mobile terminal, wherein the plurality of short range portable wireless devices comprise a first short range portable wireless device and a second short range portable wireless device;
  simultaneously forwarding multi-media data to the first short range portable wireless device and the second short range portable wireless device when the multi-media data is processed by the mobile terminal;
  forwarding a notification of an incoming call to the first short range portable wireless device in response to a receipt of the incoming call; and
  establishing a voice communication link with the first short range portable wireless device in response to an input thereof to process the incoming call, wherein the second short range portable wireless device is configured to seamlessly process the multi-media data while the first short range portable wireless device is in the voice communication link with the mobile terminal.

17. The method of claim 16, wherein the mobile terminal is preconfigured to establish the voice communication link with the first short range portable wireless device among the plurality of short range portable wireless devices.

18. The method of claim 17, further comprising establishing an additional voice communication link with the second short range portable wireless device to process the incoming call in response to an input thereof.

19. The method of claim 17, further comprising switching the voice communication link from the first short range portable wireless device to the second short range portable wireless device in response to an input thereof.

20. The method of claim 17, further comprising establishing an additional voice communication link with the second short range portable wireless device to process an additional incoming call in response to an input thereof.

21. The method of claim 16, wherein the mobile terminal is preconfigured to forgo the voice communication link with the second short range portable wireless device.

22. The method of claim 16, further comprising displaying information related to the incoming call and the first short range portable wireless device.

23. The method of claim 16, further comprising displaying an option to switch the call to at least one of the plurality of short range portable wireless devices sans the first short range portable wireless device.

24. The method of claim 23, further comprising receiving an input selecting the at least one of the plurality of short range portable wireless devices sans the first short range portable wireless device.

25. The method of claim 24, further comprising processing the input for connecting the voice communication link with the first short range portable wireless device when the input is received via the input unit.

26. The method of claim 16, wherein the input comprises a touch input applied on the mobile terminal.

27. The method of claim 16, wherein the input is generated by an acknowledge signal forwarded from the first short range portable wireless device.

28. The method of claim 16, wherein the notification comprises an alert sound.

29. The method of claim 16, further comprising displaying information related to an outgoing call and the plurality of short range portable wireless devices when a phone number is entered or a contact is selected to place the outgoing call.

30. The method of claim 16, further comprising:
  displaying a list of short range portable wireless devices available for connecting an outgoing call; and
  establishing a communication link with at least one of the short range portable wireless devices in the list to process the outgoing call when the at least one of the short range portable wireless devices is selected from the list.

31. The method of claim 16, wherein the plurality of short range portable wireless devices comprise a BLUETOOTH device.

* * * * *